Dec. 26, 1922.

R. S. BRYANT.
RIM FOR VEHICLE WHEELS.
ORIGINAL FILED NOV. 23, 1912.

1,439,941

2 SHEETS-SHEET 1

Witnesses:
R. L. Bruck.
Brennan B. West

Inventor
Richard S. Bryant
By Hull & Smith
Attys.

Dec. 26, 1922.
1,439,941

R. S. BRYANT.
RIM FOR VEHICLE WHEELS.
ORIGINAL FILED NOV. 23, 1912.

2 SHEETS-SHEET 2

Witnesses:
P. L. Bruck.
Brennan B. West

Inventor.
Richard S. Bryant,
By Hull & Smith
Attys.

Patented Dec. 26, 1922.

1,439,941

UNITED STATES PATENT OFFICE.

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

RIM FOR VEHICLE WHEELS.

Application filed November 23, 1912, Serial No. 733,094. Renewed January 21, 1918. Serial No. 213,107.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle Wheels, of which the following is a full, clear, and exact description, reference being had to the accompanying drawings.

This invention relates to vehicle wheels and has for its general object the provision of an improved form of rim whereby the removal, repair, and replacement of a pneumatic tire may be facilitated without impairing the reliability of the construction or rendering the same either ponderous or complicated. The liability of pneumatic tires to puncture and other accidents renders it necessary that the tire be easily removable from the rim upon which it is carried and yet be securely attached to said rim under all conditions of use.

It is the object of this invention to provide a rim which will permit ready access to the tire for purposes of repair, even though that tire has become firmly adherent thereto, and this, without detracting from the ease of carrying an extra rim with a fully inflated tire, or adding to the difficulty of applying that rim to the wheel upon which it is to be used. This object is attained by forming the side flanges of the rim removable from the body of the rim in such wise that in case it be desired to repair the tire, it is necessary merely to remove the body of the rim from the flanges without removing those flanges from the tire, suitable expedients being also provided for withstanding the strain of the parts both when on and off the wheel.

Figures 1, 2:
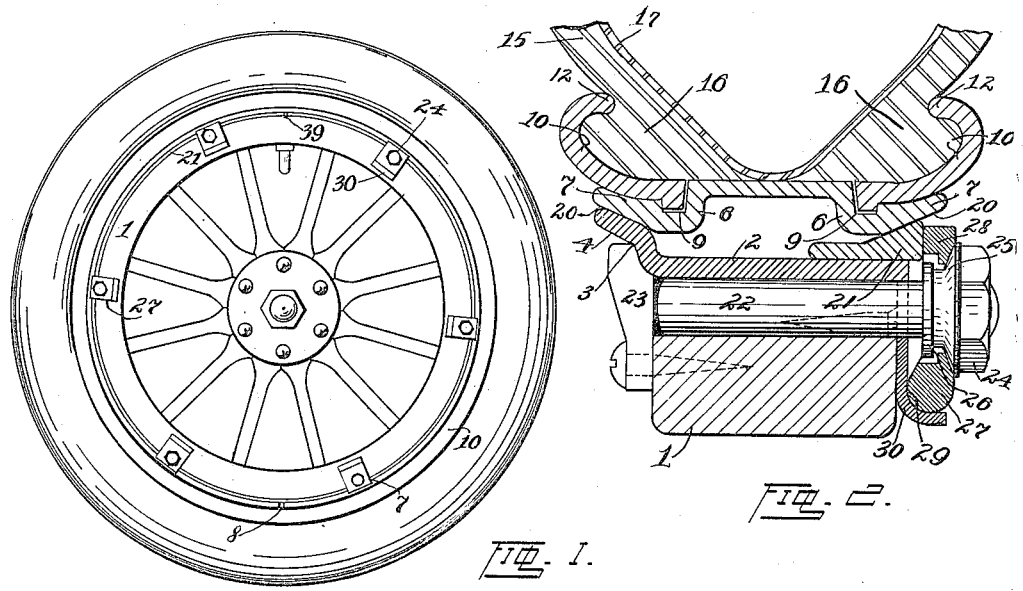
Figure 3:
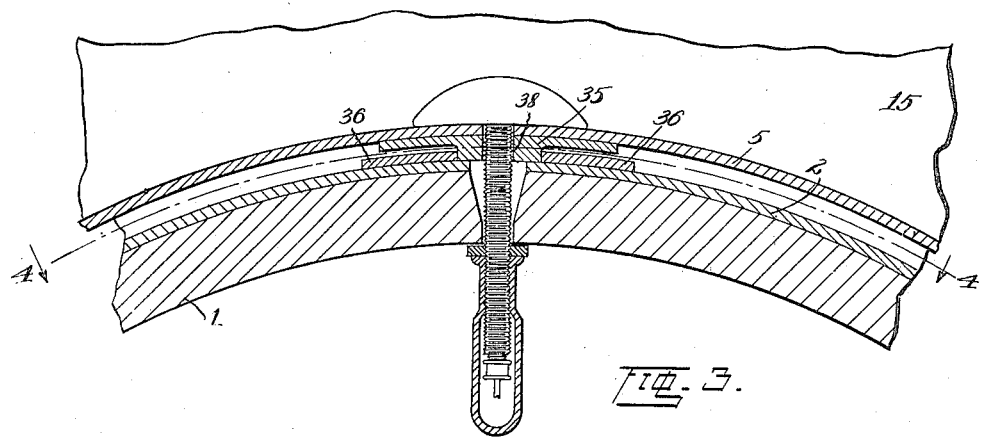
Figure 4:
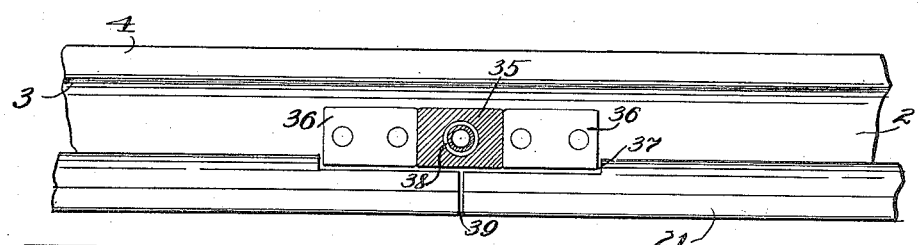
Figure 5:
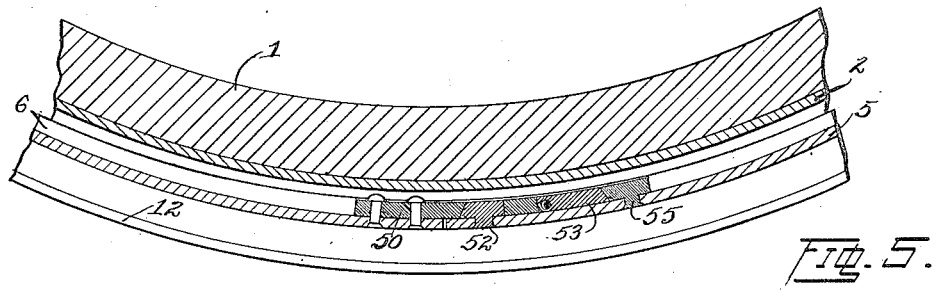
Figure 6:
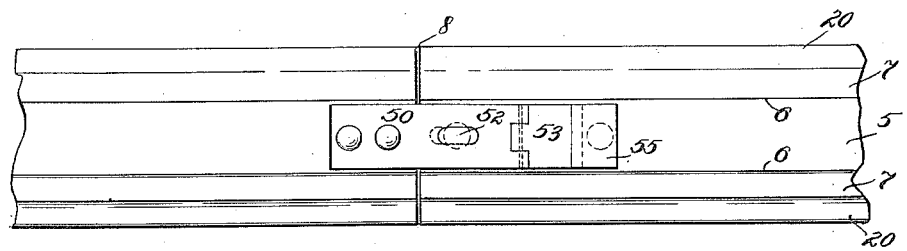
Figure 7:
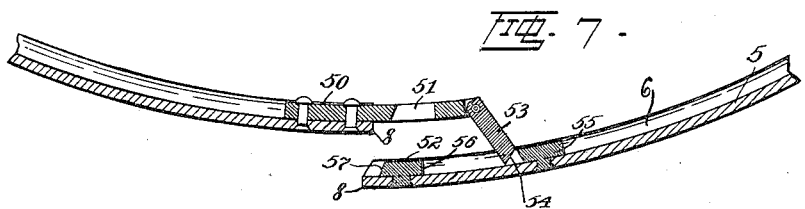
Figure 8:
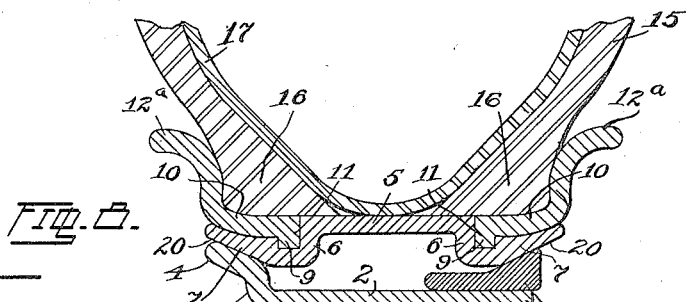

Generally speaking, my invention may be defined as consisting of the combinations and constructions recited in the claims hereto annexed and illustrated in the drawings accompanying and forming a part of this application, wherein: Fig. 1 is a side-elevational view of a vehicle wheel having a rim of my invention; Fig. 2, a transverse cross-sectional view through a portion of the rim and tire and through one of the clamps whereby the rim is held upon the wheel; Fig. 3, a detail cross-sectional view taken longitudinally through the parts associated with the valve stem of the tire; Fig. 4 is a view taken upon the curved dot-dash line 4—4 of Fig. 3 and looking downwardly so as to disclose a development of a portion of the felly band together with the wedge ring and driving blocks, the driving block carried by the rim being shown in cross section; Fig. 5 is a detail cross sectional view taken upon a longitudinal plane through a portion of the wheel adjacent to the split in the rim body; Fig. 6 is a development of the inside portion of the rim shown in Fig. 5; Fig. 7 is a longitudinal cross-sectional view taken through the portion of the rim shown in Figs. 5 and 6 and illustrating the method of disengaging the ends thereof; and Fig. 8 is a transverse cross-sectional view taken through a modified form of rim.

Describing the parts by reference characters, 1 represents the felly of a vehicle wheel of the usual or any suitable construction and formed of wood or any other desirable material. In these drawings I have illustrated the felly as surrounded by a metallic felly band 2 having at its rearward edge the outwardly turned flange 3, terminating in the outwardly flared ledge 4, the opposite edge of the felly band being plain and uninterrupted. It will be understood however, that the particular construction of the wheel has no bearing upon this invention, wherefore the felly and felly band could be made all in one piece or either could be omitted entirely so long as a proper seating member is provided for the reception of my rim. Accordingly I have hereafter denoted these parts generally by the term "circular member."

My improved rim structure comprises generally a transversely split metallic base, or rim proper, and a pair of continuous side rings or flanges, said side rings being formed for engagement with the clinches or side walls of the tire and the split middle ring or base with the mid-portion of the tire, said rings and base being also formed with inter-engaging portions whereby they may be secured against accidental relative displacement. The base, or rim proper comprises a cylindrical portion 5 having inwardly turned flanges 6—6 equally spaced from its median line, each of said flanges terminating in an outwardly turned extension 7—7, and the whole being bent into substantially circular form and having closely abutting ends 8—8. Each of the extensions 7—7 is offset inwardly from the portion 5, and is formed at its outer side adjacent to the flange 6 with an annular groove 9, the portion of the extension outside of said groove being preferably curved or deflected outwardly to some extent as illustrated in Figs. 2 and 8. Each of the extensions 7—7 is adapted to be surrounded by and interengage with an endless ring 10 having at its inner edge an inturned lip 11 fitting in the corresponding groove 9. The curvature of each ring at the point adjacent to its lip is such as to cause it to rest upon the outer face of the extension 7, while the thickness of the ring is such as to bring its outer surface substantially flush with the outer surface of the portion 5. The outside lateral edge of each of the rings is flanged to engage the side of a tire, the tips of these flanges being either bent inwardly as at 12—12 in Fig. 2 to engage the beads or clinches of a clincher tire, or turned outwardly as shown at 12ª—12ª in Fig. 8 to engage the sides of a straight wall tire.

As is well known the usual pneumatic tire consists of a U-shaped casing or shoe 15 of rubber or other flexible material, bent to annular form so as to define an inwardly opening annular recess. The lips 16—16 of this casing adjacent to the recess are generally thickened as illustrated in Figs. 2 and 8, and are held in fixed relation by a suitable rim which also closes the space between them. Located within this casing is a flexible inner tube 17 of impervious material which receives the pressure fluid, and this is the portion of the tire which most frequently requires repairing. By reference to Figs. 2 and 8, it will be apparent that the portion 5 of the middle ring is of considerable width so as to overlap slightly the lips of the casing at each side of the central recess. Accordingly it will be seen that no matter how rigidly the tire may adhere to the rings 10—10, it will always be possible to remove the inner tube with ease merely by stripping the base ring or rim proper away from these side rings. In fact, it may be found desirable in some cases to secure these rings permanently to the tire casing in the first instance, as by cementing or vulcanizing, wherefore Fig. 8 may be esteemed to illustrate this condition. The adhesion of the lips of the tire casing to the lateral portions of the rim base would be very slight because of the small area of contact, and this area of contact can obviously be reduced as much as one pleases, although it is preferable that the lips of the tire should overlap this base to some extent in order to prevent the inner tube from being forced under pressure into the space between the rings.

The lateral edges of the extensions 7—7 are interiorly flared or tapered as at 20—20 to form seating surfaces and the entire rim is preferably symmetrical about the median line so as to enable it to be applied to the circular member or wheel felly in either position.

The rim is secured about the circular member by having one extension seated upon the ledge 4 which it engages by means of its tapered portion 20, a wedge ring 21 being inserted between the opposite side of the rim and the adjacent edge of the circular member, this wedge ring being drawn toward the ledge 4 by suitable means so as simultaneously to draw this rim base upon the wheel and center it thereon.

In the present embodiment this means comprises a plurality of bolts 22 traversing the felly 1 parallel to its axis and having heads 23 at their inner ends overlapping the inner face of the felly and the side of the flange 3. The opposite ends of the bolts are threaded for the reception of nuts 24, said nuts having spherical faces 25 and inwardly projecting central hollow sleeves 26. Between each nut and the adjacent side of the felly is a clip 27 having at one side an extension or toe 28 adapted to engage the wedge ring 21 and at the side of the bolt opposite said toe or projection a heel 29 having a rocking engagement with a wear plate 30 carried by the felly. The outer face of the clip preferably has a spherical socket receiving the spherical face 35 of the nut, and the sleeve 26 is preferably interlocked with the nut so as to prevent their being separated without impeding their relative rotation. The particular construction of the clip is not claimed in this application, but is claimed in my copending application filed May 6, 1912, Serial No. 695,413.

Relative rotation between the rim as a whole and the circular member on which it is mounted is preferably prevented by means of a driving block 35 carried by the rim and located between fixed driving blocks 36—36 secured to the circular member, the edge of the wedge ring 21 being notched if necessary as at 37 for the reception of these parts. The driving block 35 is preferably apertured for the reception of the valve stem as shown at 38, and the wedge ring 21 is severed at one point so as to permit its expansion and contraction, the abutting ends thereof preferably coming substantially opposite the driving block 35 as shown at 39 in Fig. 4.

While I do not propose to confine myself to the use of this particular means for securing the rim about the wheel, I have chosen this means for illustration because of the fact that its use renders the device fully operative even though the means hereinafter described for securing the ends of the middle ring against relative movement should fail or be omitted. When the rim is surrounded by an inflated tire it is obvious that a forcible inward pressure is exerted upon the rim base tending to collapse the same. This pressure would, of course, be withstood by the abutment of the square faces of the rim-ends at the point where the rim is split although it might not be desirable to rely wholly upon this abutment for securing the ends together when the rim and its tire are being carried on the running board. Moreover, when the rim is mounted upon the wheel, the inward pressure of the tire is opposed by the expanding effect of the wedge means and this might cause the tightness of the rim upon the felly to depend upon the inflation of the tire, since a careless mechanic might not set up the nuts 24 sufficiently to expand the ring 5 against this pressure. In this case a decrease of the tire pressure might cause the rim to become loose with disastrous results. Furthermore it is desirable to employ some means for expanding the base of the rim into engagement with the side rings when the parts are assembled, so as to facilitate the operation of the device. Furthermore this securing expedient must be such as can be operated without the use of complicated tools, have no detachable parts, must be simple and reliable and must be of such compactness as to be received in the space between the middle ring and the surface of the circular member.

My preferred device for effecting all of these results is illustrated in Figs. 5, 6 and 7. Secured to the inner face of the rim-base 5 adjacent to one of its ends and between the flanges 6—6 is a forwardly extending metal tongue 50, the end whereof extends beyond such rim-end and is provided with a recess 51 adapted to receive a projection 52 carried by the opposite end of the rim 5. Pivoted to the end of the tongue 50 upon an axis substantially parallel with the axis of the ring is a member or link 53 which preferably has the same width as the tongue 50, and has its outer free end beveled as at 54 so as to engage beneath the complementarily undercut side of a second projection or abutment 55 also secured to the inner face of the rim 5 at a distance in the rear of the projection 52. The plate 53 is preferably pivoted to the tongue 50 by means of a loosely fitting pin, the length of the plate 53 being such as to cause it to abut directly against the end of the tongue 50 when in secured position without straining or shearing said pin. The side of the projection 52 adjacent to the abutment 55 is preferably square and radial, as illustrated at 56, the opposite side thereof being inclined as at 57 and the cooperating portions of the slot 51 being shaped complementarily thereto.

When it is desired to secure the ends of the rim together, the parts are brought to the relative positions illustrated in Fig. 7, after which the end of the rim which is innermost is moved radially outward so as to insert the projection 52 into the recess 51, as illustrated in Fig. 5. During this operation the member 53 acts as a toggle link to expand the rim-base sufficiently to permit its ends to pass each other, and after such base is fully expanded the member may act as a positive lock to prevent the disengagement of the parts because of the fact that its pivotal axis falls within the line joining the face of the abutment 55 and the base ends, owing to the curvature of the rim. When this is done, the expansion of the rim will be opposed by the shoulder 56 of the projection 52, while collapsing of the rim is prevented by the engagement of the tongue 50 with the inclined shoulder 57 of the projection 52 and also by the engagement of the end of the plate 53 with the side of the abutment 35.

I have illustrated the abutting ends 8 of the split rim base as spaced 180° from the valve aperture and therefore an equal distance from the severed ends 39 of the wedge ring. This arrangement is not of course essential for the purpose of my invention. While I have described my invention in detail and pointed out at considerable length the particular constructions which my experience indicates as being most desirable together with the reasons for employing such constructions, it will be apparent that a great many changes in form, construction, arrangement, and operation of parts can be employed without departing from the scope of my invention or losing the advantages thereof. Accordingly, I do not restrict myself to the construction herein shown and illustrated and described, except as the same may be specifically recited in the claims hereto annexed or may be rendered necessary by the prior state of the art.

Having thus described my invention, what I claim is:

1. The combination with a transversely split rim; of continuous tire-retaining flanges, said rim being adapted in expanded condition to interengage and laterally interlock with said flanges, and in contracted condition to release the same; and means on the respective ends of said rim adapted to snap into interlocking engagement in the expanded condition of said rim so as to prevent relative longitudinal displacement of such ends.

2. The combination with a transversely split rim; of continuous tire-retaining flanges, said rim being adapted in expanded condition to inter-engage and laterally interlock with said flanges and in contracted condition to release the same; and a tongue projecting beyond one end of said rim and adapted to snap into interlocking engagement with the other rim-end in said rim's expanded condition so as to prevent relative circumferential movement of such ends.

3. The combination with a transversely split rim; of continuous tire-retaining flanges, said rim being adapted in expanded condition to inter-engage and laterally interlock with said flanges in both directions and in contracted condition to release the same; a tongue projecting beyond one end of said rim and having a recess; and a projection on the other end of said rim adapted to snap into engagement with such recess in said rim's expanded condition.

4. The combination with a transversely split rim; of continuous tire-retaining flanges, said rim being adapted in expanded condition to inter-engage and laterally interlock with said flanges in both directions and in contracted condition to release the same; a tongue projecting beyond one end of said rim and having a recess; a projection on the other end of said rim adapted to snap into engagement with such recess in said rim's expanded condition; and means adapted thus to expand said rim.

5. The combination with a transversely split rim; of continuous tire-retaining flanges, said rim being adapted in expanded condition to inter-engage and laterally interlock with said flanges in both directions and in contracted condition to release the same; a tongue projecting beyond one end of said rim and having a recess; a projection on the other end of said rim adapted to snap into engagement with such recess in said rim's expanded condition; and means carried by said rim-ends, respectively, and adapted to co-operate thus to expand said rim.

6. The combination with a transversely split rim; of continuous tire-retaining flanges, said rim being adapted in expanded condition to inter-engage with said flanges and in contracted condition to release the same; a tongue projecting beyond one end of said rim and adapted to snap into interlocking engagement with the other rim-end in said rim's expanded condition, so as to prevent relative movement of such ends; and means adapted thus to expand said rim, said means including a member pivotally connected at one end with said first-named rim-end, and an abutment on the other rim-end adapted to co-operate with the free end of said member.

7. The combination with a transversely split rim; of continuous tire-retaining flanges, said rim being adapted in expanded condition to inter-engage with said flanges and in contracted condition to release the same; a tongue projecting beyond one end of said rim and having a recess; a projection on the other end of said rim adapted to engage such recess in said rim's expanded condition; and means adapted thus to expand said rim, said means including a member pivotally connected with said first-named rim-end, and an abutment on the other rim-end adapted to co-operate with said member.

8. The combination with a transversely split rim; of continuous tire-retaining flanges, said rim being adapted in expanded condition to inter-engage with said flanges and in contracted condition to release the same; a tongue projecting beyond one end of said rim and having a recess; a projection on the other end of said rim adapted to engage such recess in said rim's expanded condition; and means adapted thus to expand said rim, said means including a member pivoted to the end of said tongue, and an abutment on the other rim-end adapted to co-operate with said member.

9. The combination with a transversely split rim; of continuous tire-retaining flanges, said rim being adapted in expanded condition to inter-engage with said flanges and in contracted condition to release the same; a tongue projecting beyond one end of said rim and having a recess; two longitudinally spaced projections on the other end of said rim, the first of said projections being adapted to engage the recess in said tongue; and a link pivoted to the end of said tongue and adapted to abut with its free end against said second projection, whereby said rim may be expanded.

10. The combination with a transversely split tire-supporting rim; of a tongue projecting beyond one end of said rim, said tongue and the other end of said rim being provided with elements adapted to inter-engage upon relative radial movement of the rim-ends so as normally to prevent circumferential separation of such ends; and means adapted to secure said tongue and opposed rim-end against radial separation, said means including a member pivotally connected with said first-named rim-end, and an abutment on the other rim-end adapted to co-operate with said member.

11. The combination with a transversely split tire-supporting rim; of a tongue projecting beyond one end of said rim, said tongue and the other end of said rim being provided with elements adapted to inter-engage upon relative radial movement of the rim-ends so as normally to prevent circumferential separation of such ends; and means adapted to secure said tongue and opposed rim-end against radial separation, said means including a member pivoted to the end of said tongue, and an abutment on the other rim-end adapted to co-operate with said member.

12. The combination with a transversely split tire-supporting rim; of a tongue projecting beyond one end of said rim, said tongue and the other end of said rim being provided with elements adapted to inter-engage and prevent circumferential separation of such ends when the latter are in alignment; and means adapted to force said rim-ends thus into alignment and thereupon to secure said tongue and opposed rim-end against disengagement.

13. The combination with a transversely split tire-supporting rim; of a tongue projecting beyond one end of said rim, said tongue and the other end of said rim being provided with elements adapted to inter-engage and prevent circumferential separation of such ends when the latter are in alignment; and means carried by said rim-ends, respectively, said means being adapted to force said rim-ends thus into alignment and thereupon to secure said tongue and opposed rim-end against disengagement.

14. The combination with a transversely split tire-supporting rim; of a tongue projecting beyond one end of said rim, said tongue and the other end of said rim being provided with elements adapted to inter-engage and prevent circumferential separation of such ends when the latter are in alignment; and means adapted to force said rim-ends thus into alignment and thereupon to secure said tongue and opposed rim-end against disengagement, said means including a member pivotally connected with said first-named rim-end, and an abutment on the other rim-end adapted to co-operate with said member.

15. The combination with a transversely split tire-supporting rim; of a tongue projecting beyond one end of said rim, said tongue and the other end of said rim being provided with elements adapted to inter-engage and prevent circumferential separation of such ends when the latter are in alignment; and means adapted to force said rim-ends thus into alignment and thereupon to secure said tongue and opposed rim-end against disengagement, said means including a member pivoted to the end of said tongue, and an abutment on the other rim-end adapted to co-operate with said member.

16. The combination with a transversely split tire-supporting rim; of a tongue extending beyond one end of said rim and having a recess; and a projection on the other end of said rim adapted to snap into engagement with said recess when said rim-ends are in alignment.

17. The combination with a transversely split tire-supporting rim; of a tongue extending beyond one end of said rim and having a recess; a projection on the other end of said rim adapted to snap into engagement with said recess when said rim-ends are in alignment; and means adapted to secure said tongue with the recess therein thus in engagement with said projection.

18. The combination with a transversely split tire-supporting rim; of a tongue projecting beyond one end of said rim and having a recess; a projection on the other end of said rim adapted to snap into engagement with such recess when said rim-ends are in alignment; and means adapted to force said rim-ends thus into alignment.

19. The combination with a transversely split tire-supporting rim; of a tongue projecting beyond one end of said rim and having a recess; a projection on the other end of said rim adapted to snap into engagement with such recess when said rim-ends are in alignment; and means carried by said rim-ends, respectively, and adapted to co-operate to force said ends thus into alignment.

20. The combination with a transversely split tire-supporting rim; of a tongue projecting beyond one end of said rim and having a recess; a projection on the other end of said rim adapted to engage such recess when said rim-ends are in alignment; and means adapted to force said rim-ends thus into alignment, said means including a member pivotally connected with said first-named rim-end, and an abutment on the other rim-end adapted to co-operate with said member.

21. The combination with a transversely split tire-supporting rim; of a tongue projecting beyond one end of said rim and having a recess; a projection on the other end of said rim adapted to engage such recess when said rim-ends are in alignment; and means adapted to force said rim-ends thus into alignment, said means including a member pivoted to the end of said tongue, and an abutment on the other rim-end adapted to co-operate with said member.

22. The combination with a transversely split tire-supporting rim; of a tongue projecting beyond one end of said rim and having a recess; two longitudinally spaced projections on the other end of said rim, the first of said projections being adapted to engage the recess in said tongue; and a link pivoted to the end of said tongue and adapted to abut with its free end against said second projection, whereby said rim-ends may be forced into alignment.

23. The combination with a transversely split tire-supporting rim; of a tongue projecting beyond one end of said rim and having a recess; two longitudinally spaced projections on the other end of said rim, the first of said projections being adapted to engage the recess in said tongue; and a link pivoted to the end of said tongue and adapted to abut with its free end against said second projection, whereby said rim-ends may be forced into alignment, the pivotal axis of said link falling within the line joining the face of said second projection and the rim-ends.

24. The combination, with a pneumatic tire of the type having a substantially U-shaped outer casing bent to substantially annular form and an inner tube within said casing adapted to receive the pressure fluid, the lips of said casing being spaced apart, of a rim comprising a pair of continuous side rings, one for each side of said casing, and a discontinuous middle ring adapted to bridge the space between said side rings, a recessed tongue secured to the inner face of said middle ring adjacent to one of its ends and projecting beyond such end, a projection on the other end of said ring and adapted to be received in such recess, each of said side rings being of a width not greater than the thickness of the casing, means whereby said side rings may be detachably secured to said middle ring, and means whereby said rim may be secured about a wheel.

25. In a pneumatic tired wheel, the combination, with a metallic split ring having a substantially cylindrical outer surface and having depressions at the sides of said cylindrical portion, the lateral portions of said ring outside of said depressions forming supporting portions, of a continuous side ring adapted to surround each of said supporting portions, the face of each ring adjacent to its inner edge being substantially cylindrical and the outer edge of each of said side rings being deflected outwardly to engage the side of a tire, a tongue secured to the inner face of said middle ring adjacent to one of its ends and projecting beyond such end, said tongue having a recess therein, a projection secured to the other end of said ring and adapted to be received in such recess, and means for detachably securing said projection in said recess.

In testimony whereof, I hereunto affix my signature in the presence of two witnesses.

RICHARD S. BRYANT.

Witnesses:
HAROLD E. SMITH,
BRENNAN B. WEST.